(12) United States Patent
Horie

(10) Patent No.: US 10,910,870 B2
(45) Date of Patent: *Feb. 2, 2021

(54) CHARGING DEVICE AND CHARGING METHOD

(71) Applicant: Toshiba Client Solutions CO., LTD., Tokyo (JP)

(72) Inventor: Yutaka Horie, Tokyo (JP)

(73) Assignee: Toshiba Client Solutions Co., Ltd., Tokyo (JP)

(*) Notice: Subject to any disclaimer, the term of this patent is extended or adjusted under 35 U.S.C. 154(b) by 349 days.

This patent is subject to a terminal disclaimer.

(21) Appl. No.: 16/109,514

(22) Filed: Aug. 22, 2018

(65) Prior Publication Data

US 2018/0366967 A1  Dec. 20, 2018

Related U.S. Application Data

(63) Continuation of application No. 15/017,222, filed on Feb. 5, 2016, now Pat. No. 10,097,021.

(60) Provisional application No. 62/210,632, filed on Aug. 27, 2015.

(51) Int. Cl.
*H02J 7/34* (2006.01)
*H02J 7/00* (2006.01)

(52) U.S. Cl.
CPC ............ *H02J 7/342* (2020.01); *H02J 7/007* (2013.01); *H02J 7/008* (2013.01); *H02J 7/0042* (2013.01); *H02J 7/0091* (2013.01)

(58) Field of Classification Search
CPC ...... H02J 7/0022; H02J 7/0021; H02J 7/0026; H02J 7/04; H02J 7/0063; H02J 2007/0067; H02J 2007/10; H02J 7/125; H02J 7/00712; H02J 7/007188; H02J 7/342; H02J 7/0034; H02J 7/0027; H02J 7/025; H02J 7/0042; H02J 7/007; H02J 7/0047; H02J 7/027; H02J 7/1461; H02J 7/166; H02J 7/0068
See application file for complete search history.

(56) References Cited

U.S. PATENT DOCUMENTS

| | | | |
|---|---|---|---|
| 2012/0074894 A1* | 3/2012 | Chen | H02J 7/00 320/103 |
| 2012/0299530 A1* | 11/2012 | Hsu | H02J 7/34 320/103 |

(Continued)

FOREIGN PATENT DOCUMENTS

| | | |
|---|---|---|
| JP | 3-40763 U | 4/1991 |
| JP | 06-038391 | 2/1994 |

(Continued)

*Primary Examiner* — Drew A Dunn
*Assistant Examiner* — Sailesh Thapa
(74) *Attorney, Agent, or Firm* — Knobbe Martens Olson & Bear, LLP

(57) ABSTRACT

According to one embodiment, a controller changes, when a charging state transitions from a first state of charging a first battery by using a power from an external power supply to a second state of charging the first battery by using a power from the second battery and if rated power of the external power supply and the rated discharge power of the second battery are different from each other, an upper limit of an input current to a charging circuit to a value corresponding to the rated discharge power of the second battery.

9 Claims, 4 Drawing Sheets

(56) References Cited

U.S. PATENT DOCUMENTS

| | | | | |
|---|---|---|---|---|
| 2014/0239964 A1* | 8/2014 | Gach | ................... | G01R 31/36 |
| | | | | 324/433 |
| 2015/0311730 A1 | 10/2015 | Aradachi et al. | | |
| 2015/0340897 A1* | 11/2015 | Uan-Zo-Li | .............. | H02J 7/342 |
| | | | | 320/103 |
| 2016/0001719 A1* | 1/2016 | Frost | ................... | B60L 3/0046 |
| | | | | 307/10.1 |
| 2017/0063123 A1 | 3/2017 | Horie | | |

FOREIGN PATENT DOCUMENTS

| | | |
|---|---|---|
| JP | 8-2922 Y2 | 1/1996 |
| JP | 10-257680 | 9/1998 |
| JP | 2000-050522 | 2/2000 |
| JP | 2003-189501 | 7/2003 |
| JP | 2005-328660 | 11/2005 |
| JP | 2010-011594 | 1/2010 |
| JP | 2014-117054 | 6/2014 |

\* cited by examiner

CHARGING DEVICE AND CHARGING METHOD

CROSS-REFERENCE TO RELATED APPLICATIONS

This application is a continuation of U.S. application Ser. No. 15/017,222, which was filed on Feb. 5, 2016 and is titled "CHARGING DEVICE AND CHARGING METHOD," the entire disclosure of which is hereby incorporated by reference in its entirety herein, and which claims the benefit of U.S. Provisional Application No. 62/210,632, filed Aug. 27, 2015, the entire contents of which are incorporated herein by reference.

FIELD

Embodiments described herein relate generally to a charging device and a charging method.

BACKGROUND

Electronic devices including a plurality of rechargeable batteries (hereinafter referred to simply as batteries) have been developed. As an example of one of these electronic devices, there is a detachable computer including a tablet computer with a detachable keyboard which allows the computer to be used as a notebook computer or a tablet computer. The tablet includes a battery (hereinafter referred to as a main battery) by which it is powered. In order to increase the battery life of the tablet when it is attached to the keyboard, a battery (hereinafter referred to as a second battery) is also provided in the keyboard, and the tablet is powered by the main battery and the auxiliary battery when being used as a notebook computer.

In a case where both the keyboard and the tablet are connectable to an AC adapter, the second battery and the main battery are charged from the AC adapter. In a case where the keyboard is connectable to an AC adapter but the tablet is not connectable to an AC adapter, the main battery is charged from the AC adapter connected to the keyboard when the tablet is attached to the keyboard.

There has been demand, in a case where there is neither an AC adapter nor AC power available, for a technique of charging the main battery by using the power from the second battery. In battery charging in general, it is necessary to control a charging current and a charging voltage properly. However, there has been no appropriate charging control method for charging one battery by using the power of another.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a charging device configured to charge a first battery by using power from a second battery includes a contact configured to input power from an external power supply, a charging circuit connecting to the contact and the first battery, and a controller connecting to the charging circuit and configured to receive data indicating rated discharge power of the second battery. The charging circuit is configured to input the power from the external power supply or the power from the second battery and supply the first battery with a charging current according to the input power. A charging state of the charging circuit includes a first state of charging the first battery by using the power from the external power supply and a second state of charging the first battery by using the power from the second battery. The controller is configured, when the charging state of the charging circuit transitions from the first state to the second state and if rated power of the external power supply and the rated discharge power of the second battery are different from each other, to change an upper limit of an input current to the charging circuit to a value corresponding to the rated discharge power of the second battery. The charging circuit is configured to limit the charging current when the input current reaches the upper limit.

Figure 1:
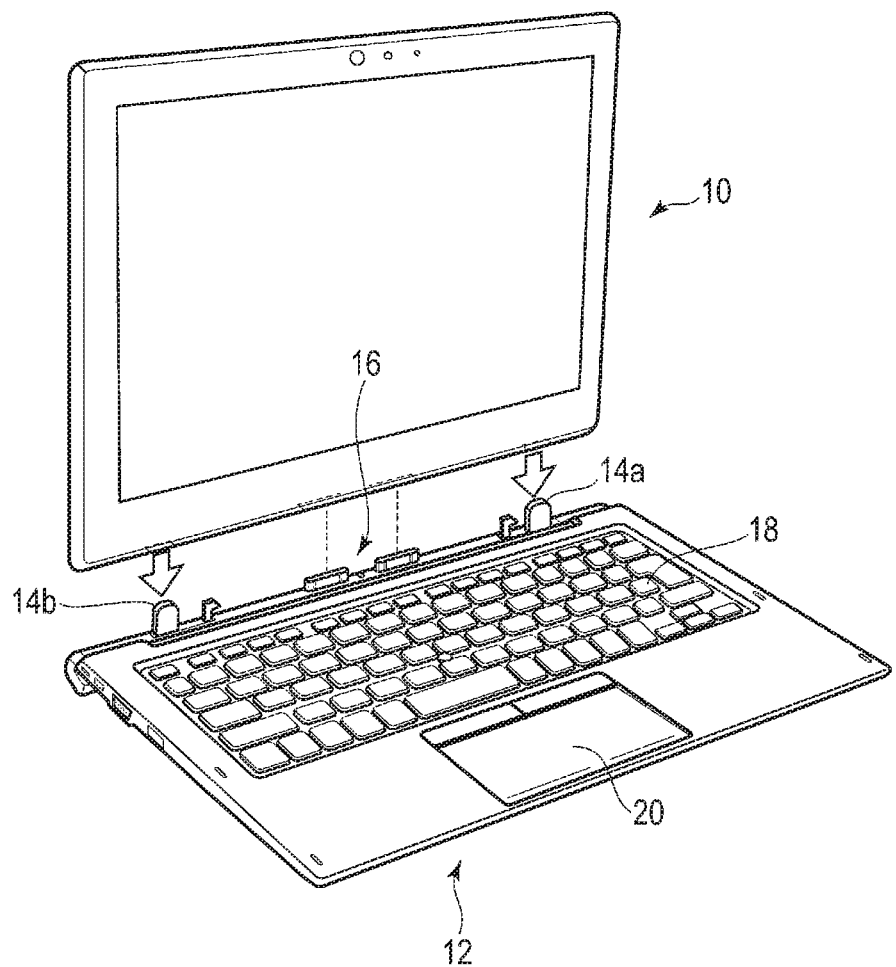
FIG. 1 is a perspective diagram showing an exemplary structure of a detachable computer of an embodiment.

FIG. 1 is a perspective diagram showing an exemplary structure of a detachable computer of an embodiment. A tablet 10 configured to input touch operations and not including a hardware keyboard is detachably attached to a keyboard dock 12 including a keyboard and the like. The tablet 10 is used alone as a tablet computer when it is not attached to the keyboard dock 12 and as a notebook computer when it is attached to the keyboard dock 12. The keyboard dock 12 includes guide pins 14a and 14b on the right and left of its back end for holding the tablet 10. Between the guide pins 14a and 14b of the back end, a docking connector 16 configured to electrically connect to the tablet 10 is provided.

The tablet 10 includes docking ports in portions corresponding to the guide pins 14a and 14b and further includes a docking connector in a portion corresponding to the docking connector 16. When the tablet 10 is attached to the keyboard dock 12 in such a manner that the guide pins 14a and 14b are inserted into the docking ports of the tablet 10, the tablet 10 and the keyboard dock 12 are combined and constitute a single unit in the same state as a notebook computer in an open state. Each of the guide pins 14a and 14b may include a hinge mechanism so that the tablet 10 can open and close with respect to the keyboard dock 12 while the tablet 10 remains combined with the keyboard dock 12.

The keyboard dock 12 may further include a touchpad 20 in addition to a keyboard 18. Although not shown in the drawing, the tablet 10 includes a built-in wireless LAN circuit but does not include a wired LAN connector, an HDMI output connector or an RGB connector. The keyboard dock 12 may include a wired LAN connector, an HDMI output connector or an RGB connector not provided in the tablet 10.

The tablet 10 and the keyboard dock 12 respectively include built-in batteries. Since the keyboard dock 12 is not used alone, the battery in the keyboard dock 12 supplies power to the tablet 10 when no AC adapter is available and the tablet 10 is attached to and used with the keyboard dock 12. Therefore, the tablet 10 can be supplied with the power from the battery in the tablet 10 as well as the power from the battery in the keyboard dock 12.

The keyboard dock 12 includes an AC adapter connector and is thus connectable to an AC adapter. Therefore, the battery in the keyboard dock 12 is charged from an AC adapter. Since the tablet 10 alone is not connectable to an AC adapter, the battery in the tablet 10 alone will not be charged from an AC adapter. When the tablet 10 is attached to the keyboard dock 12, the battery in the tablet 10 is charged from an AC adapter connected to the keyboard dock 12. However, it is also possible to configure both the battery in the tablet 10 and the battery in the keyboard dock 12 to be charged from an AC adapter by further providing the tablet 10 with an AC adapter connector so that the tablet 10 is connectable to an AC adapter.

Figure 2:
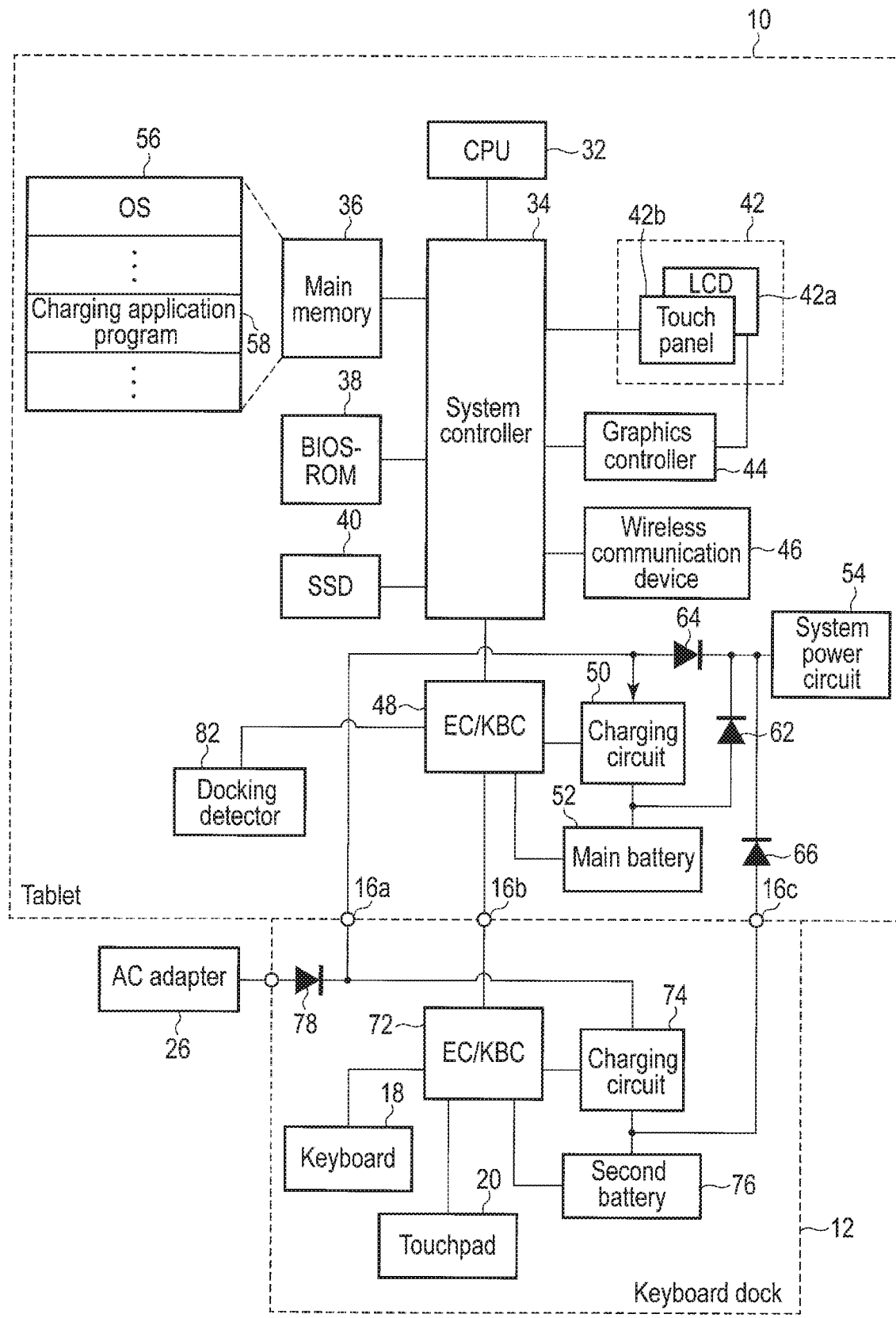
FIG. 2 is a block diagram showing an exemplary circuit structure of the detachable computer of the embodiment.

FIG. 2 is a circuit diagram showing an exemplary structure of the detachable computer including the tablet 10 and the keyboard dock 12.

The tablet 10 and the keyboard dock 12 are electrically connected to each other by docking contacts 16a, 16b and 16c included in the docking connector 16. The docking contact 16a supplies the output of an AC adapter from the keyboard dock 12 to the tablet 10, the docking contact 16b connects an EC/KBC of the tablet 10 and an EC/KBC of the keyboard dock 12 to each other, and the docking contact 16c supplies the output of a battery in the keyboard dock 12 from the keyboard dock 12 to the tablet 10.

The tablet 10 includes a CPU 32, a system controller 34, a main memory 36, a BIOS-ROM 38, a storage device, namely, a solid-state drive (SSD) 40, a touch screen display 42, a graphics controller 44, a wireless communication device 46, an embedded controller/keyboard controller (EC/KBC) 48, a charging circuit 50, a main battery 52, a system power circuit 54, a docking detector 82, and the like.

The CPU 32 is a processor configured to control operations of various units in the tablet 10. The CPU 32 executes various programs loaded from the SSD 40 into the main memory 36. The programs include an operating system (OS) 56 and various application programs. The application programs include a charging application program 58 which controls such charging as to charge the main battery 52 in the tablet 10 by using a battery (second battery) in the keyboard dock 12 as a power source, that is, the so-called inter-battery charging. The CPU 32 also executes a basic input/output system (BIOS) stored in the BIOS-ROM 38. The BIOS is a program which executes hardware control.

The system controller 34 is a device configured to connect a local bus of the CPU 32 and various units. The system controller 34 includes a built-in memory controller configured to execute access control of the main memory 36. Further, the system controller 34 includes a function of performing communication with the graphics controller 44 via a serial bus conforming to the PCI Express standard or the like.

The graphics controller 44 is a display controller configured to control an LCD 42a used as a display monitor of the tablet 10. The graphics controller 44 generates a display signal and transmits it to the LCD 42a. The LCD 42a displays a screen image based on the display signal. The LCD 42a includes a touch panel 42b thereon and constitutes a touch screen display 42. The touch panel 42b is a capacitive pointing device for performing input operations on the screen of the LCD 42a.

The wireless communication device 46 is a device configured to execute a wireless communication such as a wireless LAN or a 3G mobile communication. The tablet 10 is connected to another server or computer by the wireless communication device 46 via the Internet or the like.

The EC/KBC 48 is a single-chip microcomputer configured to execute power-supply control, battery charge control and the like. The EC/KBC 48 is connected to the charging circuit 50 and to the main battery 52.

The charging circuit 50 includes a DC/DC converter configured to decrease an input voltage, and is configured to decrease a voltage supplied from the keyboard dock 12 via the docking contact 16a, and to produce a charging current of the main battery 52 based on the decreased voltage. The input voltage of the charging circuit 50 is the output voltage (of, for example, 19 V) of an AC adapter 26 connected to the keyboard dock 12 or the output voltage (of, for example, 19 V) obtained by increasing the output voltage of the second battery 76 of, for example, 12 V in a charging circuit 74 of the keyboard dock 12. The decreased voltage is, for example, in a case where the fully charged main battery 52 has a voltage of 12.6 V, 12.6 V in the constant-voltage charging and 12.6 V or less in the constant-current charging. The battery charging will be described later with reference to FIG. 3. The output of the charging circuit 50 is supplied to a system power circuit 54 via a diode 62. The input of the charging circuit 50, that is, a voltage of 19 V supplied from the keyboard dock 12 via the docking contact 16a is also supplied to the system power circuit 54 via a diode 64. The main battery 52 includes, for example, a lithium-ion battery having a capacity of, for example, 36 watt-hours, and powers the tablet 10 unassisted for about 10 hours.

The keyboard dock 12 includes the keyboard 18, the touchpad 20, an EC/KBC 72, the charging circuit 74, and the second battery 76. The EC/KBC 72 in the keyboard dock 12 and the EC/KBC 48 in the tablet 10 are connected to each other via the docking contact 16b and exchange control data and the like with each other. The EC/KBC 72 is a single-chip microcomputer connected to the keyboard 18, the touchpad 20, the charging circuit 74 and the second battery 76 and configured to execute power-supply control, battery charging control, keyboard and touchpad control, and the like.

The charging circuit 74 includes a DC/DC converter configured to decrease the input voltage, and is configured to decrease the output voltage of the AC adapter 26 of, for example, 19 V and to produce a charging current of the second battery 76 based on the decreased voltage. The decreased voltage is, for example, in a case where the fully charged second battery 76 has a voltage of 12.6 V, 12.6 V in the constant-voltage charging and 12.6 V or less in the constant-current charging.

The output of the charging circuit 74, that is, a voltage of the second battery 76 is supplied to the tablet 10 via the docking contact 16c and further to the system power circuit 54 via a diode 66. The second battery 76 includes, for example, a lithium-ion battery of a capacity of, for example, 36 watt-hours and has a battery life of about 20 hours when the tablet 10 is attached to the keyboard dock 12.

The DC/DC converter increases an input voltage when the input contact and the output contact are switched with each other. That is, the DC/DC converter can also function as a boost converter configured to convert the output voltage of the second battery 76 into a voltage of 19 V. The charging circuit 74 supplies a voltage of 19V obtained by increasing the voltage of the second battery 76 to the tablet 10 via the docking contact 16a in a manner similar to that of the output voltage of the AC adapter 26. The voltage is supplied to the charging circuit 50 and used for the inter-battery charging.

The keyboard dock 12 is connectable to the AC adapter 26. The output of the AC adapter 26 is input to the charging circuit 74 via a diode 78. The output of the charging circuit 74 is then supplied to the second battery 76, thereby the second battery 76 is charged by the AC adapter 26. The output of the AC adapter 26 is, for example, 45 W (100-240 V AC, 50/60 Hz). The output of the AC adapter 26 is also supplied to the tablet 10 side via the docking contact 16a, and supplied to the charging circuit 50. The output of the charging circuit 50 is supplied to the main battery 52, thereby the main battery 52 is charged by the AC adapter 26. Therefore, the main battery 52 in the tablet 10 is charged by using the power from the AC adapter 26 when the tablet 10 is attached to the keyboard dock 12. But in a case where the AC adapter 26 is absent, the main battery 52 in the tablet 10 is charged by using the power from the second battery 76 in the keyboard dock 12. The output of the AC adapter 26 supplied to the tablet 10 side via the docking contact 16a is further supplied to the system power circuit 54 via the diode 64.

The tablet 10 includes a docking detector 82 configured to detect connection to the keyboard dock 12. For example, the docking detector 82 may be configured to output a check signal to the keyboard dock 12 through a contact connecting to the keyboard dock 12 and to detect connection to the keyboard dock 12 based on a reflected signal.

Figure 3:
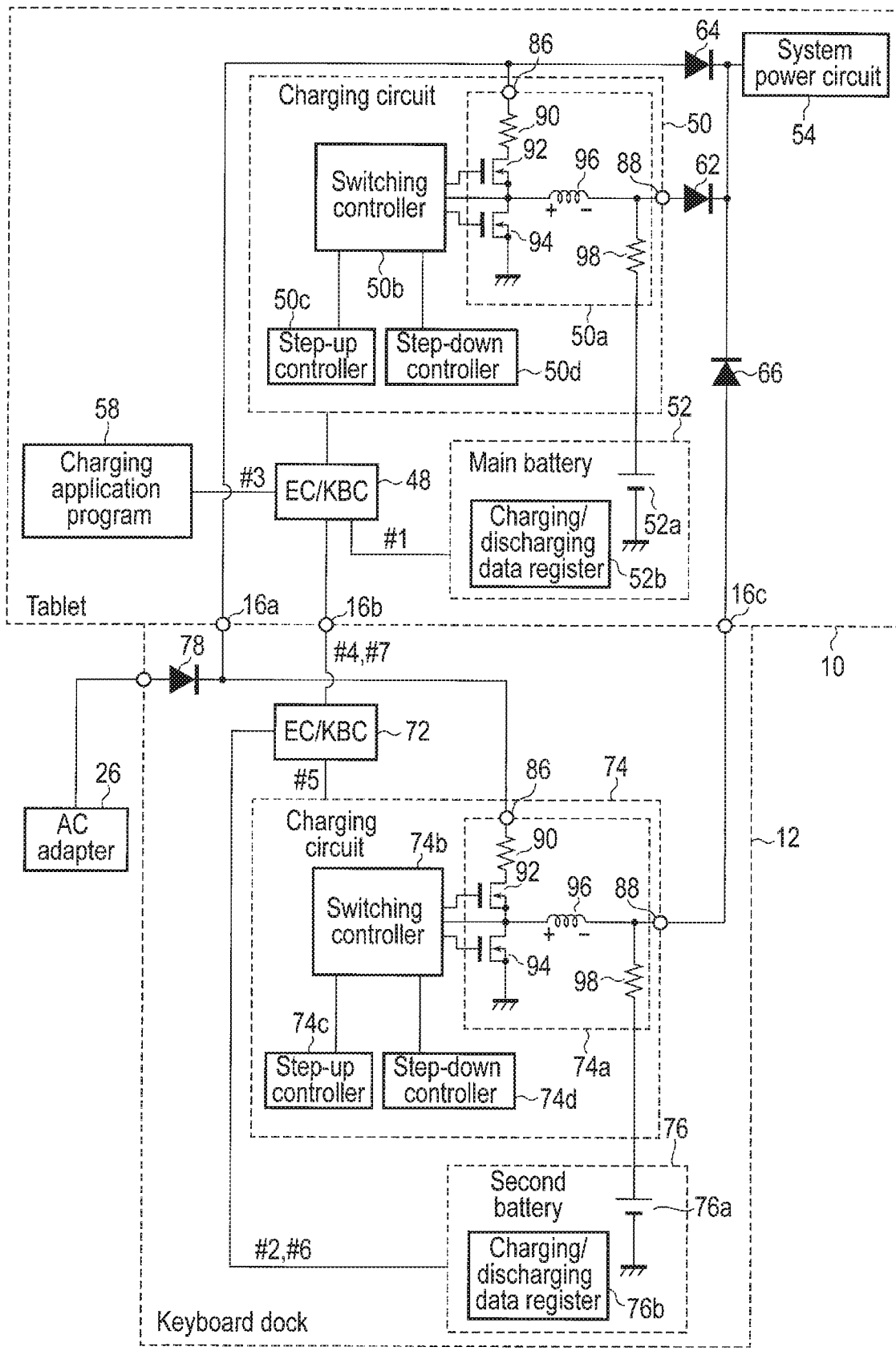
FIG. 3 is an exemplary block diagram showing a circuit for battery charging between the tablet and the keyboard dock of FIG. 2.

FIG. 3 is a circuit diagram showing the configuration to control the charging between the tablet 10 and the keyboard dock 12 of FIG. 2. The charging circuits 50 and 74 have structures substantially the same as each other, and the main battery 52 and the second battery 76 have structures basically the same as each other but may have capacities, ratings and the like different from each other. The charging circuits 50 and 74 respectively include DC/DC converters 50a and 74a each including transistors (here, MOSFETs) 92 and 94 connected in series and an inductor 96 one end of which is connected to the connecting point of the MOSFETs 92 and 94. The MOSFETs 92 and 94 are switched between an on state and an off state under the control of a switching controller 50b or 74b. One end of the series-connected MOSFETs 92 and 94 is connected to a first contact 86 via a resistor 90 and the other end thereof is connected to the ground. The first contact 86 is connected to the docking contact 16a. The other end of the inductor 96 is connected to a second contact 88. The second contact 88 is connected to the docking contact 16c. Between the second contact 88 and the second battery 76, a resistor 98 is connected.

In the charging circuits 50 and 74, the DC/DC converters 50a and 74a can switch between a function of decreasing a voltage of the first contact 86 (input contact in this case) and outputting the decreased voltage from the second contact 88 (output contact in this case) and a function of increasing a voltage of the second contact 88 (input contact in this case) and outputting the increased voltage from the first contact 86 (output contact in this case). In order to realize the switching between the step-up function and the step-down function, step-up controllers 50c and 74c and step-down controllers 50d and 74d are connected respectively to the switching controllers 50a and 74a. Based on an instruction from the EC/KBC 48 or 72, either one of the step-up controller 50c or 74c and the step-down controller 50d or 74d controls the switching controller 50a or 74a, thereby switching between the step-up function and the step-down function. Note that charging circuit 50 in the tablet 10 may not include the step-up controller 50c since there is no case in the charging circuit 50 where the output voltage of the main battery 52 is increased and then output from the contact 86.

The main battery 52 and the second battery 76 respectively include lithium ion batteries 52a and 76a and charging/discharging data registers 52b and 76b for storing data of battery charging/discharging control. Although not shown in the drawing, each of the main battery 52 and the second battery 76 includes a sensor configured to sense an environmental temperature. The data of charging/discharging control includes a maximum allowable charging current of the battery, a maximum allowable charging voltage of the battery, a discharge rating of the battery, an environmental temperature, a rated temperature, and the like. The discharge rating is a rated discharge power obtained by multiplying a discharge current by a discharge voltage, but may be a rated discharge current instead. The rated temperature is an upper limit temperature at which the battery can operate normally.

Figure 4:
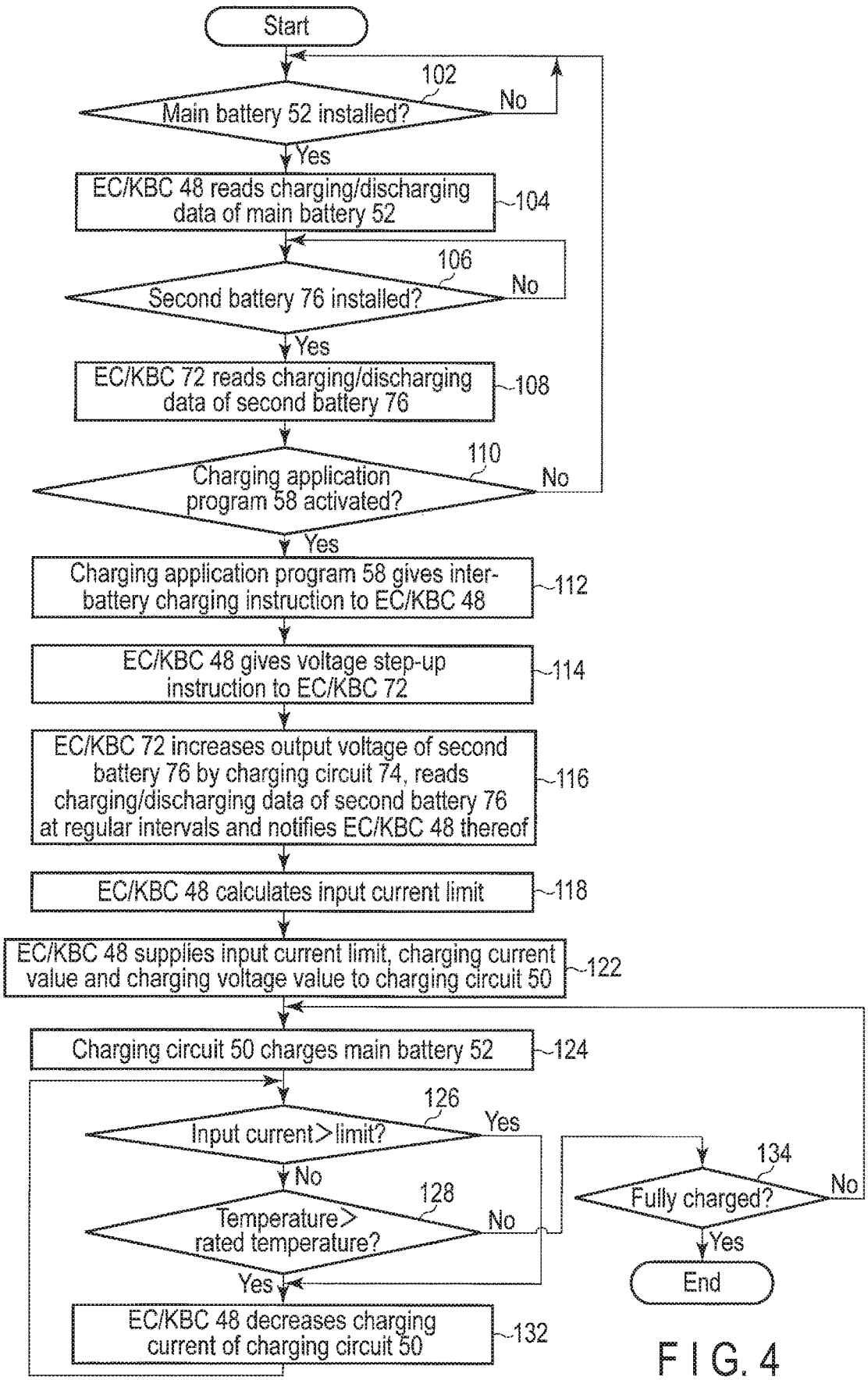
FIG. 4 is a flowchart showing an exemplary procedure of a charging operation of the embodiment.

FIG. 4 is a flowchart showing a procedure of the charging control of the embodiment.

In block 102, the EC/KBC 48 detects installation/uninstallation of the main battery 52. When detecting the main battery 52 being installed, the EC/KBC 48 reads in block 104 the data of the charging/discharging control of the main battery 52 from the charging/discharging data register 52b of the main battery 52. The data of the charging/discharging control may include a maximum allowable charging current, a maximum allowable charging voltage, a discharge rating, an environmental temperature, a rated temperature and the like (signal #1 of FIG. 3).

In block 106, the EC/KBC 72 detects installation/uninstallation of the second battery 76. When detecting the second battery 76 being installed, the EC/KBC 72 reads in block 108 the data of the charging/discharging control of the second battery 76 from the charging/discharging data register 76b of the second battery 76. The data of the charging/discharging control may include a maximum allowable charging current, a maximum allowable charging voltage, a discharge rating, an environmental temperature, a rated temperature and the like (signal #2 of FIG. 3).

In this way, when the main battery 52 or the second battery 76 is installed, the EC/KBC 48 or 72 automatically operates to read the data of the charging/discharging control. Note that the EC/KBC 48 may read, if data of the discharge rating and the rated temperature of the second battery 76 has been stored in a memory of the tablet 10, the data of the discharge rating and the rated temperature from the memory.

In block 110, the system controller 34 determines whether the charging application program 58 has been activated or not. If the application program has not been activated, the process of block 102 is repeated. An activation time of the charging application program 58 can be set in advance by the user. For example, it is possible to configure the system controller 34 to display on the LCD 42a a menu which inquires the user whether to perform the inter-battery charging or not when the tablet 10 is attached to the keyboard dock 12, the AC adapter 26 is not connected to the keyboard dock 12, and the amount of charge remaining in the main battery 52 is a predetermined amount or less. The charging application program 58 is activated when receiving an instruction to perform the inter-battery charging from the user. Even when the tablet 10 is attached to keyboard dock 12, the AC adapter 26 is not connected to the keyboard dock 12, and the amount of charge remaining in the main battery 52 is a predetermined amount or less, it is not always necessary to charge the main battery 52. This is because, as long as the tablet 10 is attached to the keyboard dock 12, it is possible to power the tablet 10 by the second battery 76 even when there is no charge available in the main battery 52. It is also possible to automatically activate the charging application program 58 when the tablet 10 is attached to the keyboard dock 12, the AC adapter 26 is not connected to the keyboard dock 12, the amount of charge remaining in the main battery 52 is a predetermined amount or less, and the amount of charge remaining in the second battery 76 is large. Further, it is also possible to automatically activate the charging application program 58 when the tablet 10 is attached to the keyboard dock 12 and the user gives an instruction to perform the inter-battery charging at a given time.

Note that the inter-battery charging may be unnecessary when the tablet 10 is attached to the keyboard dock 12 and the AC adapter 26 is connected to the keyboard dock 12, as it is possible to charge the main battery 52 by using the power from the AC adapter 26 in that case.

The charging application program 58, when activated, gives an instruction to the EC/KBC 48 in block 112 to perform the inter-battery charging from the second battery to the main battery (signal #3 of FIG. 3).

When receiving the instruction, the EC/KBC 48 gives an instruction to the EC/KBC 72 in block 114 to increase the output voltage of the second battery 76 to 19 V (signal #4 of FIG. 3).

When receiving the instruction to increase the voltage, the EC/KBC 72 gives an instruction to the step-up controller 74c of the charging circuit 74 in block 116 (signal #5 of FIG. 3) to control the DC/DC converter 74a to perform the step-up operation. According to the instruction, the DC/DC converter 74a increases the output voltage of the second battery 76 applied to the second contact 88 to 19 V and outputs the increased voltage from the first contact 86. At the same time, the EC/KBC 72 accesses the charging/discharging data register 76b of the second battery 76 at regular intervals and reads the data of the charging/discharging control (signal #6 of FIG. 3) and notifies the read data of the charging/discharging control to the EC/KBC 48 in the tablet 10 (signal #7 of FIG. 3).

In the inter-battery charging, to realize speedy and safe charging by using the full capacity of the second battery 76 without decreasing the life of the second battery 76, it is preferable that the main battery 52 be charged by maximum discharge power or a maximum discharge current within a range of the discharge rating of the second battery 76. In order to charge the main battery 52 by maximum discharge power or a maximum discharge current within a range of the discharge rating of the second battery 76, it is necessary to control the upper limit of a charging current supplied from the charging circuit 50. Since the charging current corresponds to the input current of the charging circuit 50, in the present embodiment, the input current of the charging circuit 50 needs to be controlled. Therefore, in block 118, the EC/KBC 48 calculates an upper limit (limit) of the input current of the charging circuit 50 based on the discharge rating of the second battery 76. Note that the discharge voltage of the second battery 76, that is, the voltage of the second contact 88 of the charging circuit 74 is increased to 19 V in the DC/DC converter 74a of the charging circuit 74 and then input to the first contact 86 of the charging circuit 50 in the tablet 10 via the docking contact 16a. The DC/DC converter 74a loses energy when increasing the voltage. The EC/KBC 48 calculates an input current limit based on power obtained by correcting the rated discharge power of the second battery 76 in consideration of the loss produced by increasing the voltage. For example, when the rated discharge power of the second battery 76 is 60 W and the loss produced by increasing the voltage is 10%, since the input voltage of the charging circuit 50 is 19 V, the input current of the charging circuit 50 is set to be (60 W×0.9)/19 V=2.84 A or less so that the second battery 76 will not discharge power exceeding the rated discharge power.

Note that the EC/KBC 48 calculates the input current limit based on the rated power of the AC adapter 26 stored in the memory of the tablet 10 in advance in the case of charging the main battery 52 by using only the power from the AC adapter 26 without using the power from the second battery 76 (first charging state). When the AC adapter 26 is detached, the charging state transits from the first state of charging the main battery 52 by using only the power from the AC adapter 26 to the second state of charging the main battery 52 by using the power from the second battery 76. Here, if the discharge rating of the second battery 76 or a value obtained by correcting the discharge rating of the second battery 76 in consideration of the conversion loss is different from the rating of the AC adapter 26, the EC/KBC 48 changes the input current limit. That is, the EC/KBC 48 sets an input current limit greater than the input current limit set to the charging performed by using only the power of the AC adapter 26 if the discharge rating of the second battery 76 or a value obtained by correcting the discharge rating of the second battery 76 in consideration of the conversion loss is greater than the rating of the AC adapter 26. By setting in this way, power greater than the rating of the AC adapter 26 will be output from the second battery 76. On the other hand, the EC/KBC 48 sets an input current limit less than the input current set to the charging performed by using only the power of the AC adapter 26 if the discharge rating of the second battery 76 or a value obtained by correcting the discharge rating of the second battery 76 in consideration of the conversion loss is less than the rating of the AC adapter 26. By setting in this way, power less than the discharge rating of the second battery 76 will be output from the second battery 76.

In block 122, the EC/KBC 48 notifies the input current limit calculated in block 118 to the charging circuit 50 (signal #8 of FIG. 3). Further, the EC/KBC 48 calculates a charging current and a charging voltage according to the data of the charging/discharging control of the main battery 52 and a charging mode set to the tablet 10 such as a high-speed charging mode or a low-speed charging mode, and transmits the charging current and the charging voltage obtained by calculation together with the input current limit to the charging circuit 50 (signal #8 of FIG. 3).

In block 124, according to the instruction transmitted to the charging circuit 50, the step-down controller 50d controls the DC/DC converter 50a to perform the step-down operation. The DC/DC converter 50a decreases the increased voltage (=19 V) of the second battery 76 applied to the first contact 86, supplies a charging current based on the decreased voltage to the main battery 52, and thereby charges the main battery 52. Note that, since the battery 52 is first charged by a constant current, the charging circuit 50 controls the decreased voltage of the DC/DC converter 50a to make the charging current constant. Since the charging current is constant, the charging voltage increases as the battery charging proceeds. When the charging voltage exceeds a certain value, for example, 12.6 V, the charging mode is switched to a constant-voltage charging mode, and the charging circuit 50 then controls the decreased voltage of the DC/DC converter 50a to make the charging voltage constant.

In block 126, the charging circuit 50 determines whether an input current exceeds the input current limit or not. If the input current exceeds the input current limit, in block 132, the charging circuit 50 controls the DC/DC converter 50*a* to decrease the charging current. In this way, the second battery 76 is prevented from outputting power greater than the rated discharge power.

In block 128, the EC/KBC 48 determines whether the environmental temperature of the second battery 76 exceeds the rated temperature or not. If the environmental temperature exceeds the rated temperature, in block 132, the EC/KBC 48 notifies the charging circuit 50 to control the DC/DC converter 50*a* to decrease the charging current.

If the determination result is no in both blocks 126 and 128, the EC/KBC 48 determines in block 134 whether the main battery 52 is fully charged or not. If the result is negative, the charging process of block 124 continues.

In the battery charging performed by using the power from the AC adapter in general, the charge power is controlled on the basis of the rating of the AC adapter. For example, although the rated charge power of the battery is 100 W, the battery will be charged, in a case where the rated power of the AC adapter is 45 W, by 45 W or less. Conventionally, there has not been any appropriate charging control methods for charging the main battery by using the power of the second battery. If the above-described charging control is applied to the case of charging the main battery by using the power from the second battery, in such a case where the rated power of the AC adapter is less than the rated discharge power of the second battery as described above, the second battery will discharge power at the level of the rated power of the AC adapter which is needlessly less than the rated discharge power of the second battery, and consequently it takes time for charging the main battery. In this case, the rated discharge power of the second battery is not fully used. In contrast, in a case where the rated power of the AC adapter is greater than the rated discharge power of the second battery, since the second battery discharges power at the level greater than its rated discharge power, a protection circuit will set off to stop the discharge from the second battery and consequently the electronic device will be turned off. Alternatively, if no protection circuit sets off and the second battery continues discharging power at the level greater than the rated discharge power, the second battery will catch fire or the life of the second battery will decrease.

According to the embodiment, in charging the main battery 52 by using the power of the second battery 76, the rated discharge power of the second battery 76 on the discharge side is read out, and based on a maximum discharge power or a maximum discharge current within a range of the rated power, charging control is executed. With this configuration, since the second battery 76 does not discharge power at a level greater than its discharge rating, the safety of the second battery 76 is ensured. Since the main battery 52 is charged according to the discharge rating of the second battery 76, the battery is speedily charged. Further, by also executing the charging control according to the temperature of the second battery 76 on the discharge side, the safety of the second battery 76 is further ensured.

Although the case of a detachable computer has been described in the embodiment, the embodiment is not limited to this and can be applied to all electronic devices including a plurality of rechargeable batteries and configured to perform inter-battery charging.

In the present embodiment, the main battery 52 is charged by temporarily increasing the voltage of the second battery 76 in the keyboard dock 12 including the built-in second battery 76, supplying the increased voltage to the side of the tablet 10 including the built-in main battery 52, and then decreasing the voltage on the tablet 10 side. But if the tablet 10 includes a step-up/step-down charger including a function of increasing and then decreasing the voltage of input power, it is possible to apply the voltage of the second battery 76 to the charging circuit of the main battery 52 directly without increasing and then increase the voltage by the step-up/step-down charger. In this case, there is no need to consider the loss produced by increasing the voltage.

Although the embodiment has been described a case where the battery is first charged by a constant current and then charged by a constant voltage, the charging control is not limited to this case. Further, the battery, although having been assumed to be a lithium-ion battery, is not limited to this and may be a battery of a different kind.

Still further, although the above description has been based on an assumption that one battery charges the other battery, one or more batteries may charge one or more batteries.

The various modules of the systems described herein can be implemented as software application programs, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A charging device configured to charge a first battery by a power from an AC adaptor or a power from a second battery, the AC adaptor being detachable to the charging device, the charging device comprising:
   a first charging circuit connectable to the AC adaptor and the first battery wherein the first charging circuit is configured to
      be set in a first state when the first charging circuit is connected to the AC adaptor or in a second state when the first charging circuit is not connected to the AC adaptor,
      decrease a voltage from the AC adaptor to produce a first charge voltage and charge the first battery by the first charge voltage in the first state, and
      increase a voltage from the second battery to produce a second charge voltage and charge the first battery by the second charge voltage in the second state;
   a first controller configured to control the first battery and the first charging circuit;
   a second charging circuit connectable to the AC adaptor and the second battery wherein the second charging circuit is configured to decrease the voltage from the AC adaptor to produce a third charge voltage and charge the second battery by the third charge voltage when the second charging circuit is connected to the AC adaptor;
   a second controller configured to control the second battery and the second charging circuit; and
   a register configured to store charging/discharging information indicative of a rated discharge power of the second battery, wherein the first controller is configured to
- receive the charging/discharging information which the second controller reads from the register at regular intervals when the first charging circuit is in the second state,
- decrease an upper limit of an input current to the first charging circuit when the rated discharge power of the second battery is less than a rated discharge power of the AC adaptor, and
- increase the upper limit of the input current to the first charging circuit when the rated discharge power of the second battery is not less than the rated discharge power of the AC adaptor.

2. The charging device of claim 1, wherein
the first controller is configured to decrease the upper limit of the input current to the first charging circuit to make the power from the second battery less than the rated discharge power of the second battery when the rated discharge power of the second battery is less than the rated discharge power of the AC adaptor.

3. The charging device of claim 1, wherein
the first controller is configured to increase the upper limit of the input current to the first charging circuit to make the power from the second battery not less than the rated discharge power of the second battery when the rated discharge power of the second battery is not less than the rated discharge power of the AC adaptor.

4. The charging device of claim 1, wherein
the second charging circuit further comprises a second converter configured to increase the voltage from the second battery;
the first charging circuit further comprises a first converter configured to decrease an output voltage from the second converter;
the first converter and the second converter are connected to an output line of a contact to be connected to the AC adaptor; and
the second converter is configured to supply the output voltage from the second converter to the first converter through the output line.

5. The charging device of claim 1, further comprising:
a first unit comprising the first battery, the first controller, and a display; and
a second unit comprising the second battery, the second controller, and a keyboard, wherein the first unit is detachably connected to the second unit.

6. A charging method for charging a first battery by a power from an AC adaptor or a power from a second battery, the method comprising:
connectable to the AC adaptor and the first battery wherein the first charging circuit is configured to
- be set in a first state when the first charging circuit is connected to the AC adaptor or in a second state when the first charging circuit is not connected to the AC adaptor,
decreasing, by a first charging circuit, a voltage from the AC adaptor to produce a first charge voltage and charging the first battery by the first charge voltage in the first state when the AC adaptor is connected;
increasing, by a second charging circuit, a voltage from the second battery to produce a second charge voltage and charging the first battery by the second charge voltage when the AC adaptor is not connected;
decreasing, by a second charging circuit, the voltage from the AC adaptor to produce a third charge voltage and charging the second battery by the third charge voltage when the AC adaptor is connected;
receiving a charging/discharging information indicative of a rated discharge power of the second battery from a register at regular intervals when the first battery is charged by the second charging voltage;
decreasing an upper limit of an input current to the first charging circuit when the rated discharge power of the second battery is less than a rated discharge power of the AC adaptor; and
increasing the upper limit of the input current to the first charging circuit when the rated discharge power of the second battery is not less than the rated discharge power of the AC adaptor.

7. The method of claim 6, further comprising:
decreasing the upper limit of the input current to the first charging circuit to make the power from the second battery less than the rated discharge power of the second battery when the rated discharge power of the second battery is less than the rated discharge power of the AC adaptor.

8. The method of claim 6, further comprising:
increasing the upper limit of the input current to the first charging circuit to make the power from the second battery not less than the rated discharge power of the second battery when the rated discharge power of the second battery is not less than the rated discharge power of the AC adaptor.

9. The method of claim 6, further comprising:
increasing the voltage from the second battery by a second converter; and
decreasing an output voltage from the second converter by a first converter, wherein
the first converter and the second converter are connected to an output line of the AC adaptor; and
the second converter is configured to supply the output voltage from the second converter to the first converter through the output line.

* * * * *